United States Patent
Finkle

(10) Patent No.: US 9,923,439 B2
(45) Date of Patent: *Mar. 20, 2018

(54) HYBRID ELECTRIC MOTOR WITH SELF ALIGNING PERMANENT MAGNET AND SQUIRREL CAGE ROTORS

(71) Applicant: Louis J. Finkle, Lakewood, CA (US)

(72) Inventor: Louis J. Finkle, Lakewood, CA (US)

(73) Assignee: MOTOR GENERATOR TECHNOLOGY, INC., Signal Hill, CA (US)

(*) Notice: Subject to any disclaimer, the term of this patent is extended or adjusted under 35 U.S.C. 154(b) by 181 days.

This patent is subject to a terminal disclaimer.

(21) Appl. No.: 14/151,333

(22) Filed: Jan. 9, 2014

(65) Prior Publication Data

US 2015/0194866 A1    Jul. 9, 2015

(51) Int. Cl.
*H02K 16/00* (2006.01)
*H02K 21/46* (2006.01)
(Continued)

(52) U.S. Cl.
CPC .............. *H02K 21/46* (2013.01); *H02K 16/02* (2013.01); *H02K 17/26* (2013.01); *H02K 1/22* (2013.01);
(Continued)

(58) Field of Classification Search
CPC ...... H02K 16/025; H02K 21/46; H02K 16/02; H02K 16/04; H02K 1/22; H02K 1/223;
(Continued)

(56) References Cited

U.S. PATENT DOCUMENTS

| 2,209,558 A | 7/1940 | Bing et al. |
| 2,209,588 A | 7/1940 | Bing et al. |

(Continued)

FOREIGN PATENT DOCUMENTS

| CN | 102868268 | * | 1/2011 | ............ H02K 16/02 |
| CN | 102868268 | * | 1/2013 | |

(Continued)

OTHER PUBLICATIONS

102868268CNA.tran Translation of Yu H CN102868268.*
(Continued)

*Primary Examiner* — Joshua Benitez-Rosario
*Assistant Examiner* — Maged Almawri
(74) *Attorney, Agent, or Firm* — Kenneth L. Green; Averill & Green

(57) ABSTRACT

A hybrid induction motor includes a fixed stator, an independently rotating Hybrid Permanent Magnet/squirrel Cage (HPMSC) outer rotor, and a Squirrel Cage (SC) inner rotor fixed to a motor shaft. The HPMSC rotor has spaced part permanent magnets and sets of first bars between consecutive permanent magnets. The SC rotor has groups of second bars, and slots in an outer surface between consecutive groups of the second bars. The HPMSC rotor is initially accelerated by cooperation of the stator with the first bars. The permanent magnets create a rotating magnetic field cooperating with the second bars to accelerate the SC rotor. As the HPMSC rotor accelerates towards synchronous RPM, the stator field reaches into the HPMSC rotor and cooperates with the permanent magnets to transition to synchronous operation. Salient poles created by cooperation of the permanent magnets with the slots lock the two rotors at synchronous RPM.

19 Claims, 3 Drawing Sheets

(51) Int. Cl.
*H02K 16/02* (2006.01)
*H02K 17/26* (2006.01)
*H02K 1/22* (2006.01)
*H02K 1/27* (2006.01)
*H02K 1/28* (2006.01)

(52) U.S. Cl.
CPC ............... *H02K 1/223* (2013.01); *H02K 1/27* (2013.01); *H02K 1/2706* (2013.01); *H02K 1/276* (2013.01); *H02K 1/2786* (2013.01); *H02K 1/28* (2013.01); *H02K 16/00* (2013.01)

(58) Field of Classification Search
CPC ...... H02K 1/27; H02K 1/2706; H02K 1/2786; H02K 1/28; H02K 1/276
USPC ........... 310/156.82, 211, 212, 114, 125, 266, 310/166, 269, 156.78–156.81, 156.53, 310/156.56, 156.57, 111, 112
See application file for complete search history.

(56) References Cited

U.S. PATENT DOCUMENTS

| | | | |
|---|---|---|---|
| 2,243,616 A | 5/1941 | Bing et al. | |
| 2,287,286 A | 6/1942 | Bing et al. | |
| 2,558,540 A | 6/1951 | Clos | |
| 2,864,017 A * | 12/1958 | Waltscheff | H02K 16/025 310/115 |
| 3,445,699 A * | 5/1969 | Beaudry | H02K 17/30 310/125 |
| 4,151,431 A | 4/1979 | Johnson | |
| 4,285,725 A | 8/1981 | Gysel et al. | |
| 4,482,034 A | 11/1984 | Baermann | |
| 4,508,998 A | 4/1985 | Hahn | |
| 4,578,609 A | 3/1986 | McCarty | |
| 4,829,205 A | 5/1989 | Lindgren et al. | |
| 5,166,654 A | 11/1992 | Doyelle | |
| 5,508,576 A | 4/1996 | Nagete et al. | |
| 5,594,289 A | 1/1997 | Minato | |
| 6,181,047 B1 | 1/2001 | Nitta | |
| 6,376,959 B1 | 4/2002 | Leupold | |
| 6,380,655 B1 * | 4/2002 | Ide | H02K 16/02 310/181 |
| 6,771,000 B2 | 8/2004 | Kim et al. | |
| 6,864,773 B2 | 3/2005 | Perrin | |
| 7,459,815 B2 | 12/2008 | Han et al. | |
| 7,567,004 B2 | 7/2009 | Smith | |
| 7,741,746 B2 | 6/2010 | Groening | |
| 7,928,621 B2 * | 4/2011 | Han | H02K 16/00 310/112 |
| 8,072,108 B2 | 12/2011 | Finkle et al. | |
| 8,097,993 B2 | 1/2012 | Finkle | |
| 8,288,908 B2 | 10/2012 | Finkle et al. | |
| 8,390,162 B2 | 3/2013 | Finkle et al. | |
| 2004/0014181 A1 | 1/2004 | Svedas et al. | |
| 2004/0041481 A1 | 3/2004 | Kuo | |
| 2006/0038457 A1 | 2/2006 | Miyata | |
| 2006/0175924 A1 * | 8/2006 | Han | H02K 7/125 310/166 |
| 2006/0226722 A1 * | 10/2006 | Kim | H02K 16/02 310/114 |
| 2007/0090707 A1 | 4/2007 | Moriya | |
| 2007/0216248 A1 * | 9/2007 | Han | H02K 16/02 310/114 |
| 2007/0228856 A1 | 10/2007 | Bates et al. | |
| 2008/0169717 A1 * | 7/2008 | Takashima | H02K 21/028 310/114 |
| 2008/0272667 A1 * | 11/2008 | Ionel | H02K 1/276 310/156.83 |
| 2010/0219304 A1 | 9/2010 | Miros et al. | |
| 2011/0101814 A1 * | 5/2011 | Finkle | H02K 21/46 310/156.83 |
| 2011/0156518 A1 * | 6/2011 | Bright | H02K 19/106 310/103 |
| 2011/0163623 A1 * | 7/2011 | Rens | H02K 7/11 310/114 |
| 2013/0057091 A1 * | 3/2013 | Kim | H02K 21/44 310/46 |
| 2013/0234553 A1 * | 9/2013 | Kusase | H02K 16/02 310/114 |
| 2013/0278096 A1 | 10/2013 | Finkle | |

FOREIGN PATENT DOCUMENTS

| | | |
|---|---|---|
| CN | 1360748 | 7/2014 |
| DE | 4421594 | 7/2014 |
| GB | 495813 | 11/1938 |
| JP | 51-47208 | 4/1976 |
| JP | 62-117558 | 11/1988 |
| JP | 9065591 | 11/1988 |
| JP | 09065591 | 3/1997 |
| JP | H 07-203644 A | 3/1997 |
| JP | 11-341757 | 12/1999 |
| JP | 11341757 | * 12/1999 |
| JP | 2002-315244 | 10/2002 |
| JP | 2003-088071 | 3/2003 |
| JP | 2003-088071 A | 3/2003 |
| JP | 2004 135377 A | 3/2003 |
| JP | 2004 336915 A | 11/2004 |
| JP | 2005-210826 | 8/2005 |
| JP | 2005-210826 A | 8/2005 |
| JP | 2004 140978 | 11/2005 |
| JP | 2006-254638 | 9/2006 |
| JP | 2006-352973 A | 9/2006 |
| JP | 2007-503199 | 2/2007 |
| JP | 2008-148455 | 6/2008 |
| JP | 2008-195251 | 8/2008 |
| JP | 2011-061933 | 5/2011 |
| KR | 10-2005-011667 | 12/2005 |
| KR | 10-2005-0116677 A | 12/2005 |
| WO | WO 88/05976 | 8/1988 |
| WO | WO2004107539 | 12/2004 |

OTHER PUBLICATIONS

USPTO Translation of CN102868268.*
JP 11341757 English Translation.*
EIC STIC 2800 Search Report 548636.*

* cited by examiner

HYBRID ELECTRIC MOTOR WITH SELF ALIGNING PERMANENT MAGNET AND SQUIRREL CAGE ROTORS

BACKGROUND OF THE INVENTION

The present invention relates to electric motors and in particular to an induction motor having an independently rotating permanent magnet rotor variably coupled to an inductive rotor to reconfigure the motor from asynchronous induction operation at startup to synchronous operation after startup for efficient operation.

A preferred form of electric motors are brushless AC induction motors. The rotors of induction motors include a cage (or squirrel cage resembling a "hamster wheel") rotating inside a stator. The cage comprises axially running bars angularly spaced apart on the outer perimeter of the rotor. An AC current provided to the stator introduces a rotating stator magnetic field inside the rotor, and the rotating field inductively induces current in the bars. The current induced in the bars creates an induced magnetic field which cooperates with the stator magnetic field to produce torque and thus rotation of the rotor.

The introduction of current into the bars requires that the bars are not moving (or rotating) synchronously with the rotating stator magnetic field because electromagnetic induction requires relative motion (called slipping) between a magnetic field and a conductor in the field. As a result, the rotor must slip with respect to the rotating stator magnetic field to induce current in the bars to produce torque, and the induction motors are therefore called asynchronous motors.

Unfortunately, low power induction motors are not highly efficient at designed operating speed, and are even less efficient under reduced loads because the amount of power consumed by the stator remains constant at such reduced loads.

One approach to improving induction motor efficiency has been to add permanent magnets to the rotor. The motor initially starts in the same manner as a typical induction motor, but as the motor reached its operating speed, the stator magnetic field cooperates with the permanent magnets to enter synchronous operation. Unfortunately, the permanent magnets are limited in size because if the permanent magnets are too large, they prevent the motor from starting. Such size limitation limits the benefit obtained from the addition of the permanent magnets.

BRIEF SUMMARY OF THE INVENTION

The present invention addresses the above and other needs by providing a hybrid induction motor which includes a fixed stator, an independently rotating hybrid permanent magnet/squirrel cage (HPMSC) outer rotor, and a Squirrel Cage (SC) inner rotor fixed to a motor shaft. The HPMSC rotor has N angularly spaced part permanent magnets and N sets of a plurality of first bars angularly spaced apart between consecutive permanent magnets. The SC rotor has N groups of angularly spaced apart second bars, and slots in an outer surface of the SC rotor between consecutive groups of the second bars. The HPMSC rotor is initially accelerated by cooperation of the stator with the first bars. The permanent magnets create a rotating magnetic field in the SC rotor cooperating with the second bars to accelerate the SC rotor. As the HPMSC rotor accelerates towards synchronous RPM, the stator field reaches into the HPMSC rotor and cooperates with the permanent magnets to transition to synchronous operation. Salient poles are created by cooperation of the permanent magnets with the slots in the SC rotor to lock the two rotors at synchronous RPM.

In accordance with one aspect of the invention, there is provided an inner Squirrel Cage (SC) rotor having angularly spaced apart axially extending slots on an outer surface of the inner SC rotor. The spacing of the slots matching the spacing of permanent magnets in an independently rotating hybrid permanent magnet/squirrel cage (HPMSC) outer rotor. At synchronous speed the slots and permanent magnets cooperate to form salient poles coupling the rotation of the SC inner rotor with the HPMSC outer rotor, eliminating a need for mechanical coupling of the HPMSC outer rotor with the SC inner rotor.

In accordance with another aspect of the invention, there is provided a motor having an improved sequence of inductive startup and transition to efficient synchronous operation. The design of the first bars of the HPMSC outer rotor produces sufficient torque to over come the drag of the SC inner rotor created by the permanent magnets. As a result, the HPMSC outer rotor reaches synchronous RPM quickly. As the HPMSC outer rotor accelerates faster than the SC inner rotor, the cooperation of the permanent magnets and the second bars of the SC inner rotor create more torque on SC inner rotor to accelerate the SC inner rotor. When first rotor reaches near synchronous rpm, the stator flux penetrates to second bars of the SC inner rotor applying additional torque to further accelerate the SC inner rotor toward synchronous RPM.

In accordance with still another aspect of the invention, there is provided a motor having an HPMSC outer rotor and SC inner rotor coupled by the cooperation of permanent magnets in the HPMSC outer rotor and axially extending slots in the surface of the SC inner rotor. The depth of the slots may be altered based on the purpose of the motor to optimize locking of the SC inner rotor to the HPMSC outer rotor.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
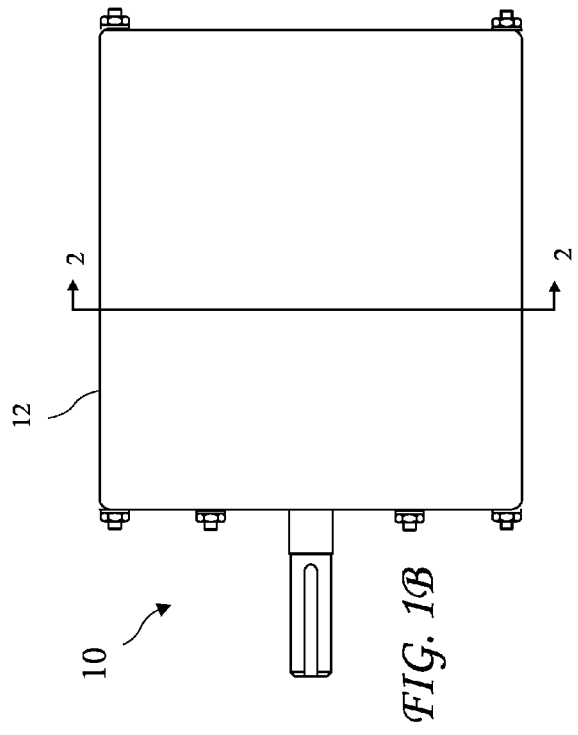
FIG. 1A shows an end view of an electric motor having an independently rotating Hybrid Permanent Magnet/squirrel Cage (HPMSC) outer rotor and a Squirrel Cage (SC) inner rotor fixedly coupled to a motor shaft, according to the present invention.
Figure 1B:
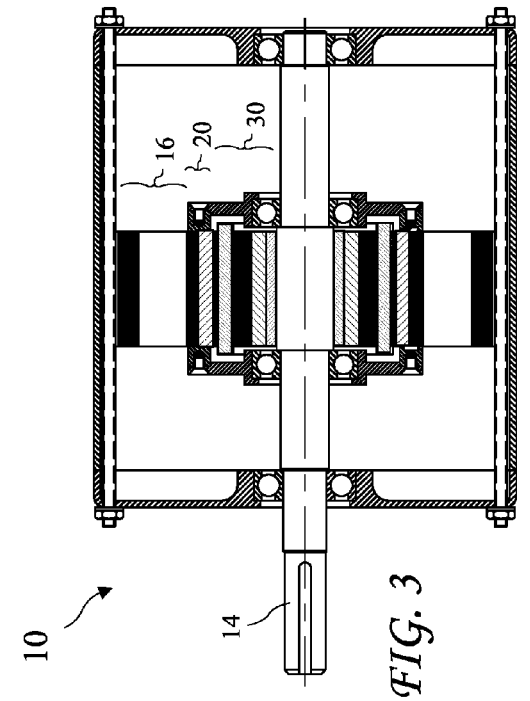
FIG. 1B shows a side view of the electric motor having an independently rotating HPMSC outer rotor and a Squirrel Cage (SC) inner rotor fixedly coupled to a motor shaft, according to the present invention.
Figure 2:
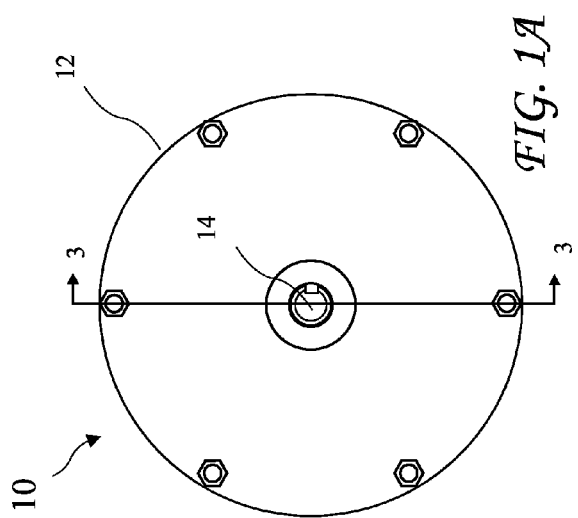
FIG. 2 shows a cross-sectional view of the electric motor having the independently rotating outer permanent magnet/squirrel cage rotor and the (SC) inner rotor fixedly coupled to a motor shaft taken along line 2-2 of FIG. 1B, according to the present invention.
Figure 3:
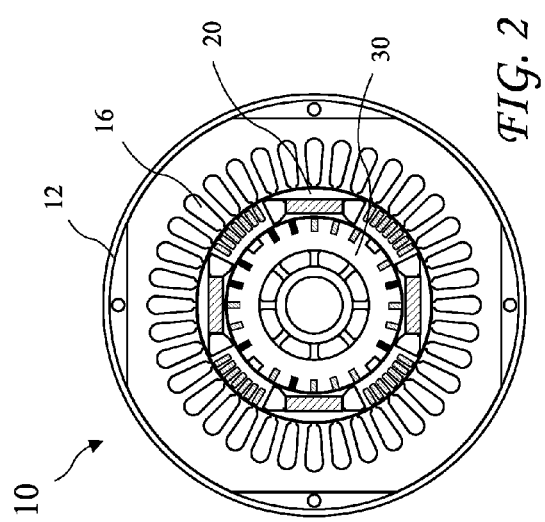
FIG. 3 shows a cross-sectional view of the electric motor having the independently rotating HPMSC outer rotor and the SC inner rotor fixedly coupled to a motor shaft taken along line 3-3 of FIG. 1A, according to the present invention.

An end view of an electric motor 10 having an independently rotating Hybrid Permanent Magnet/squirrel Cage (HPMSC) outer rotor 20 and a Squirrel Cage (SC) inner rotor 30 fixedly coupled to a motor shaft 14, according to the present invention is shown in FIG. 1A, and a side view of the electric motor 10 is shown in FIG. 1B. A cross-sectional view of the electric motor 10 taken along line 2-2 of FIG. 1B, is shown in FIG. 2, and a cross-sectional view of the electric motor 10 taken along line 3-3 of FIG. 1A is shown in FIG. 3. The electric motor 10 includes a housing 12, a stator portion 16 fixedly coupled to the housing 12, the independently rotating HPMSC outer rotor 20 riding on bearings 29 (see FIG. 7), and the SC inner rotor 30 fixed to the motor shaft 14.

Figure 4:
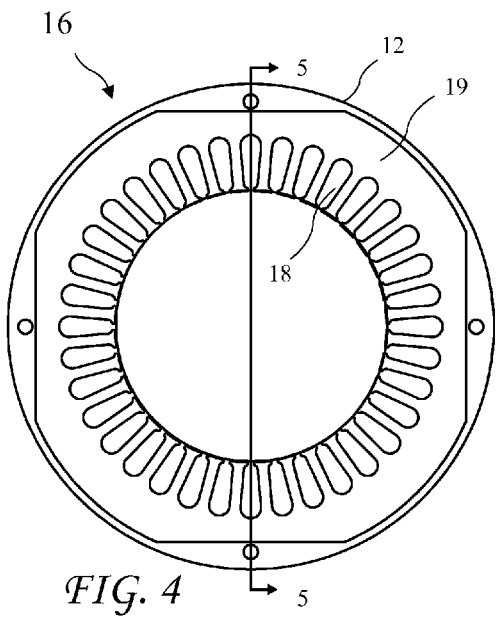
FIG. 4 shows a cross-sectional view of a housing and fixed stator portion of the electric motor having the independently rotating HPMSC outer rotor and the SC inner rotor fixedly coupled to a motor shaft taken along line 2-2 of FIG. 1B, according to the present invention.
Figure 5:
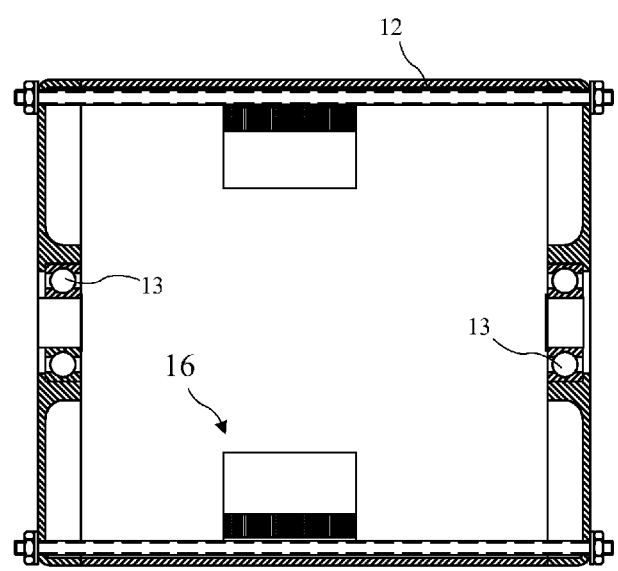
FIG. 5 shows a cross-sectional view of the housing and the fixed stator portion of the electric motor having the independently rotating HPMSC outer rotor and the SC inner rotor fixedly coupled to a motor shaft taken along line 5-5 of FIG. 4, according to the present invention.

A cross-sectional view of the housing 12 and fixed stator portion 16 of the electric motor 10 taken along line 2-2 of FIG. 1B, is shown in FIG. 4 and a cross-sectional view of the housing 12 and the fixed stator portion 16 taken along line 5-5 of FIG. 4, is shown in FIG. 5. Fixed stator windings 18 reside in a stator core 19. The stator windings 18 create a rotating stator magnetic field when provided with an Alternating Current (AC) signal. The housing 12 includes bearings 13 for carrying the shaft 14.

Figure 6:
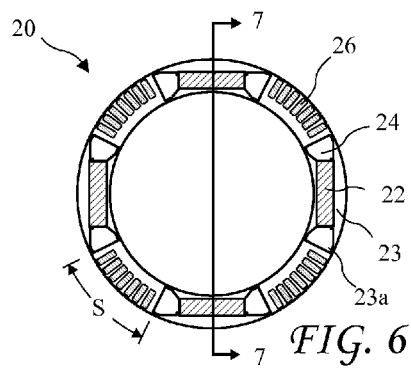
FIG. 6 shows a cross-sectional view of the independently rotating HPMSC outer rotor of the electric motor having the independently rotating HPMSC outer rotor and the SC inner rotor fixedly coupled to a motor shaft taken along line 2-2 of FIG. 1B, according to the present invention.
Figure 7:
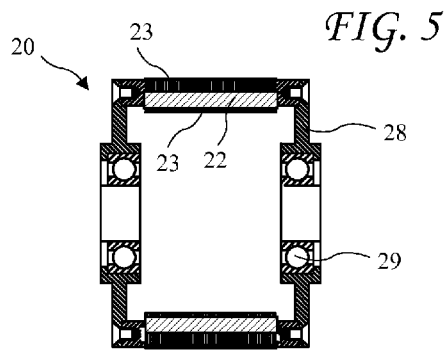
FIG. 7 shows a cross-sectional view of the independently rotating HPMSC outer rotor of the electric motor having the independently rotating HPMSC outer rotor and the SC inner rotor fixedly coupled to a motor shaft taken along line 7-7 of FIG. 6, according to the present invention.

A cross-sectional view of the independently rotating HPMSC outer rotor 20 taken along line 2-2 of FIG. 1B, is shown in FIG. 6 and a cross-sectional view of the independently rotating HPMSC outer rotor 20 taken along line 7-7 of FIG. 6, is shown in FIG. 7. The HPMSC outer rotor 20 includes angularly spaced apart permanent magnets 22 and angularly spaced apart first bars 26 residing in a first rotor core 23. The HPMSC outer rotor 20 may include any even number of permanent magnets 22, for example, two, four, six, eight, etc. permanent magnets 22. Non-ferrous gaps 24 in the rotor core 23 are present at ends of each permanent magnet 22 and the angular width between successive magnets 22 and gaps 24 is an angular segment S. The gaps 24 are air gaps or non ferrous material to minimize flux leakage, if a ferrous material was present at ends of the magnets 22, magnetic flux would curl back into the magnets 22, shorting much of the magnetic flux lines back into the magnets 22. The core 23 is preferably a laminated core and thin sections 23a of the core 23 holding the lamination sections together are considered areas of flux leakage. The thickness of the thin areas 23a are preferably optimized to minimize the leakage while maintaining mechanical integrity of the rotor core 23. The bars 26 are not necessarily but are preferably evenly angularly spaced apart and angularly between the magnets 22.

Rotor end caps 28 are attached to opposite ends of the HPMSC outer rotor 20 and include bearings 29 allowing the HPMSC outer rotor 20 to rotate freely on the motor shaft 14. The bearings 29 are preferably low friction bearings (for example, ball bearings), but may be simple bushings (for example, bronze bushings or oilite bushings).

Figure 8:
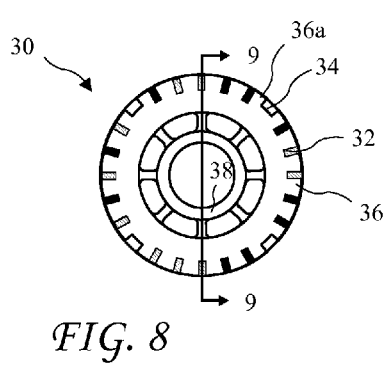
FIG. 8 shows a cross-sectional view of an SC inner rotor of the electric motor having the independently rotating HPMSC outer rotor and the SC inner rotor fixedly coupled to a motor shaft taken along line 2-2 of FIG. 1B, according to the present invention.
Figure 9:
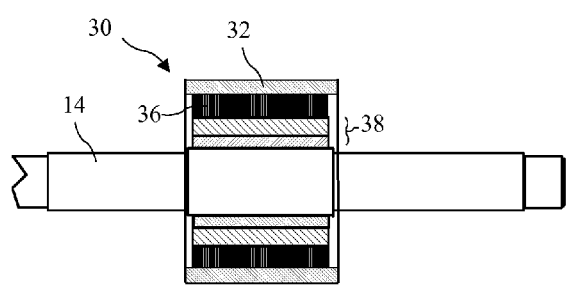
FIG. 9 shows a cross-sectional view of the SC inner rotor of the electric motor having the independently rotating HPMSC outer rotor and the SC inner rotor fixedly coupled to a motor shaft taken along line 9-9 of FIG. 8, according to the present invention.

A cross-sectional view of the SC inner rotor 30 of the electric motor 10 taken along line 2-2 of FIG. 1B, is shown in FIG. 8 and a cross-sectional view of the SC inner rotor 30 of the electric motor 10 taken along line 9-9 of FIG. 8, is shown in FIG. 9. The SC inner rotor 30 is fixed to the motor shaft 14 and couples the HPMSC outer rotor 20 to the motor shaft 14. Second bars 36 reside in a second rotor core 36. The bars are not necessarily but are preferably evenly angularly spaced apart, but are more preferably bi-laterally symmetric (i.e., are in symmetric pairs on opposite sides. A balance between bar 26 resistance and rotor core 23 saturation may be optimized and the shape, number and dimensions of the bars 26 may have great effect on performance, for example, motor startup.

Angularly spaced apart, axially extending slots 34 are formed in a cylindrical outer face 36a of the rotor core 36. The number and spacing of the slots 34 are matched to the number and spacing of the magnets 22 in the HPMSC outer rotor 20. The size, and particularly, the depth, of the slots 34 substantially determine the coupling of the HPMSC outer rotor 20 to the SC inner rotor 30 by affecting the salient poles 50 (see FIG. 11). The salient poles 50 in turn determine the coupling between the HPMSC outer rotor 20 and the SC inner rotor 30 when the motor 10 operates at synchronous speed.

Figure 10:
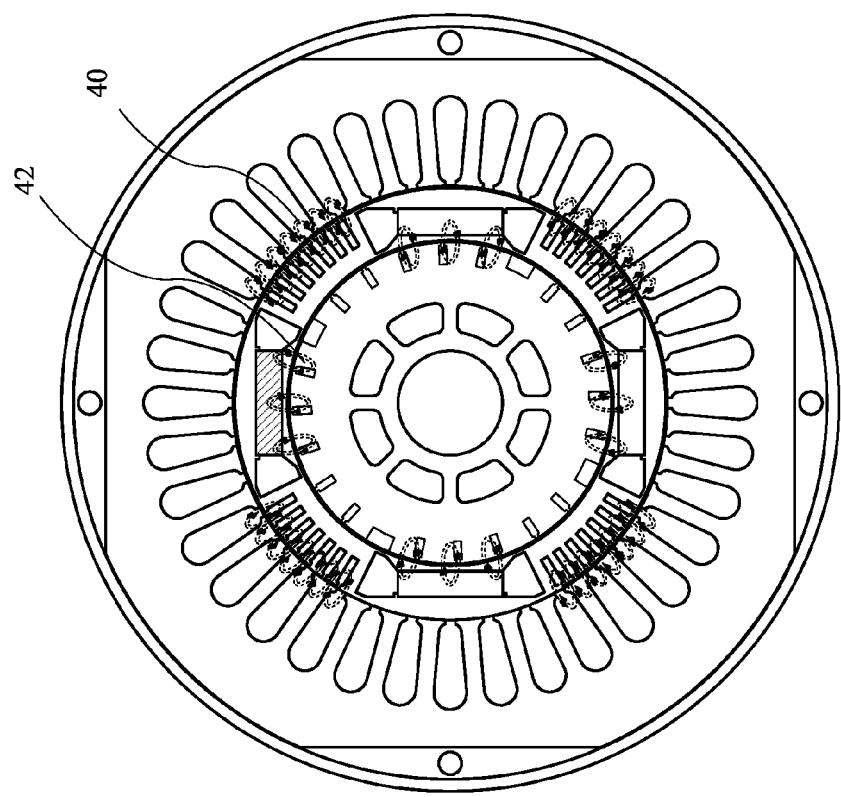
FIG. 10 shows a cross-sectional view of the electric motor at startup taken along line 2-2 of FIG. 1B, according to the present invention.

A cross-sectional view of the electric motor 10 at startup, taken along line 2-2 of FIG. 1B, is shown in FIG. 10. When AC power is provided to the stator 16, the rotating stator magnetic field inductively cooperates with the first bars 26 in the HPMSC outer rotor 20 to create current in the first bars 26 and the resulting magnetic flux lines 40. However, at start up, the interaction of the rotating stator magnetic field with the stationary rotor bars produces a rotor frequency causing a surface effect, and the rotating stator magnetic field does not penetrate deeply into HPMSC outer rotor 20 and therefore does not reach to portions of the first rotor bars 26 below the surface of the HPMSC outer rotor 20. The rotating stator field then accelerates the HPMSC outer rotor 20. The second bars 32 in the SC inner rotor 30 cooperate with the magnets 22 in the HPMSC outer rotor 20 to accelerate the SC inner rotor 30.

The slots 34 in the SC inner rotor 30 do not align with the magnets 22 at start up because the HPMSC outer rotor 20 accelerates first, causing the magnets 22 (and thus the magnet magnetic field) the skip over the salient poles 50, but still inductively cooperating with second bars 32 of the SC inner rotor 30 until the SC inner rotor 30 reaches near synchronous rpm where the attraction of the salient poles 50 to the magnets 22 is sufficient to hold the SC inner rotor 30 at the same RPM as the HPMSC outer rotor 20. The design of salient poles 50 determines the coupling torque. The coupling torque is designed to be slightly higher than the rated torque of motor to hold the SC inner rotor 30 at the same RPM as the HPMSC outer rotor 20 during normal operation. This design is also advantageous because the design prevents the motor 10 from completely stalling during overload because when the load on the motor shaft 14, and thus on the SC inner rotor 30, exceeds the motor design torque, the SC inner rotor 30 can break away from the HPMSC outer rotor 20 leaving the HPMSC outer rotor 20 at synchronous RPM.

As the HPMSC outer rotor 20 increases in RPM, the rotor frequency decreases, as this occurs the rotating stator magnetic field reaches deeper into HPMSC outer rotor 20 and into the SC inner rotor 30, creating a duel cage rotor effect of a bar section at the surface of rotor and larger section bars deeper into rotor, producing more starting resistance reducing current spikes.

Figure 11:
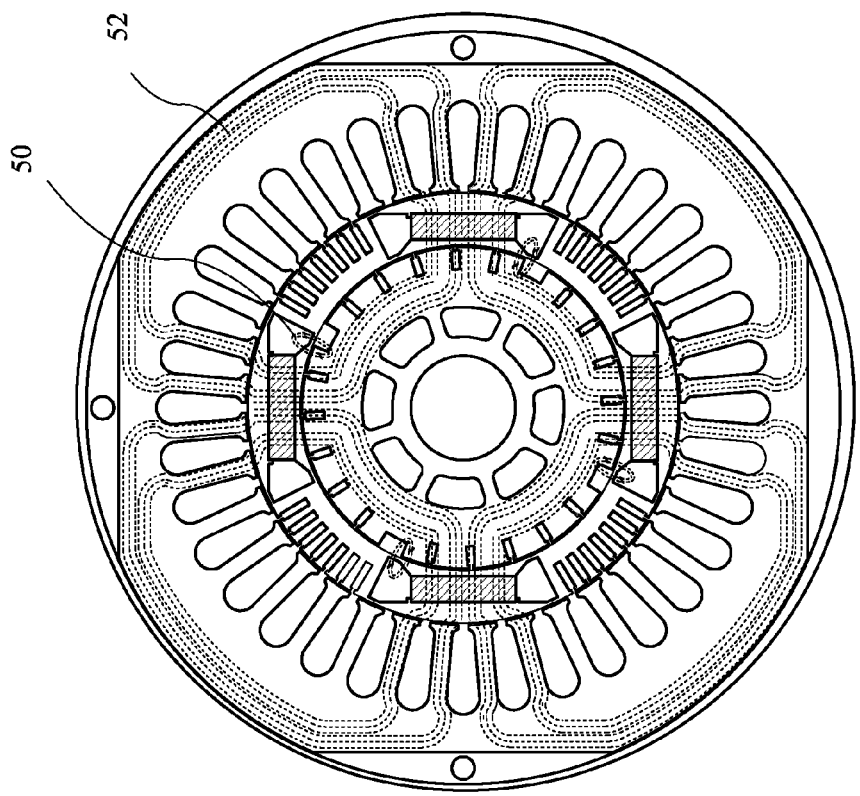
FIG. 11 shows a cross-sectional view of the electric motor at synchronous speed taken along line 2-2 of FIG. 1B, according to the present invention.

A cross-sectional view of the electric motor 10 at synchronous speed, taken along line 2-2 of FIG. 1B, is shown in FIG. 11. As the HPMSC outer rotor 20 and the SC inner rotor 30 approach synchronous speed the rotor frequency decreases, the cooperation of the HPMSC outer rotor 20 with the rotating stator magnetic field transitions from induction to permanent magnet operation and the magnetic flux 40 and 42 diminishes and flux lines 52 passing though the magnets 22 and into the SC inner rotor 30 grow, resulting the HPMSC outer rotor 20 converging to synchronous operation. The HPMSC outer rotor 20 continues to pull the SC inner rotor 30 towards synchronous speed, and the salient poles 50 couple the SC inner rotor 30 to the HPMSC outer rotor 20 for efficient permanent magnet synchronous operation.

While the invention herein disclosed has been described by means of specific embodiments and applications thereof, numerous modifications and variations could be made thereto by those skilled in the art without departing from the scope of the invention set forth in the claims.

I claim:

1. A clutch-less hybrid squirrel cage and permanent magnet motor comprising: an Alternating Current (AC) power signal having a frequency; a motor housing; a stator fixed to the motor housing and producing a rotating stator magnetic field rotating at a synchronous speed corresponding the frequency of the AC power signal;
    a first motor shaft rotatably connected to the motor housing and extending from at least one end of the motor housing for attachment to a load;
    a hybrid squirrel cage and permanent magnet outer rotor residing coaxial with the motor shaft and having a first rotor core, a number N of angularly spaced apart permanent magnets embedded in the first rotor core, and first squirrel cage bars embedded in the first rotor core, the hybrid squirrel cage and permanent magnet outer rotor capable of rotating independently of the first motor shaft and not mechanically rotationally coupled to the first motor shaft or any other motor shaft during any operation, other than mechanical rotational coupling through bearings supporting the hybrid squirrel cage and permanent magnet outer rotor; and a squirrel cage inner rotor residing coaxial with the motor shaft and having a second rotor core, second squirrel cage bars embedded in the second rotor core, and the squirrel cage inner rotor rotationally fixed to the motor shaft, wherein: the hybrid squirrel cage and permanent magnet outer rotor resides between the stator and the squirrel cage inner rotor; and the hybrid squirrel cage and permanent magnet outer rotor is magnetically rotationally coupled to the squirrel cage inner rotor at the synchronous speed.

2. The motor of claim 1, wherein;
    at startup the first bars of the hybrid squirrel cage and permanent magnet outer rotor inductively cooperate with the rotating stator magnetic field to apply torque to the hybrid squirrel cage and permanent magnet outer rotor; and
    at startup, cooperation of the rotating stator magnetic field with the permanent magnets of the hybrid squirrel cage and permanent magnet outer rotor is reduced by the cooperation of the first bars with the rotating stator magnetic field, to facilitate initial acceleration of the hybrid squirrel cage and permanent magnet outer rotor.

3. The motor of claim 1, wherein the permanent magnets comprise an even number of permanent magnets.

4. The motor of claim 1, wherein the hybrid squirrel cage and permanent magnet outer rotor includes end caps holding bearings, the bearings riding on the motor shaft, and the hybrid squirrel cage and permanent magnet outer rotor not otherwise mechanically connected to any structure.

5. The motor of claim 1, wherein the squirrel cage inner rotor does not include permanent magnets.

6. The motor of claim 1, wherein the hybrid squirrel cage and permanent magnet outer rotor is not mechanically rotationally coupled to any output or input shaft of the motor or any rotational load.

7. The motor of claim 1, wherein the hybrid squirrel cage and permanent magnet outer rotor is rotationally mechanically coupled to the motor shaft at opposite by bearing and not otherwise mechanically coupled to any structure.

8. The motor of claim 1, wherein as the hybrid squirrel cage and permanent magnet outer rotor accelerates, the permanent magnets create a rotating magnetic field inductively cooperating with the second bars of the squirrel cage inner rotor, and accelerating the squirrel cage inner rotor.

9. The motor of claim 8, wherein as both the hybrid squirrel cage and permanent magnet outer rotor and the squirrel cage inner rotor approach synchronous operation, slots on the surface of the squirrel cage inner rotor cooperate with the permanent magnets of the hybrid squirrel cage and permanent magnet outer rotor to create salient poles magnetically coupling rotation of the squirrel cage inner rotor to the hybrid squirrel cage and permanent magnet outer rotor at the synchronous speed, the slots angularly spaced apart to be simultaneously alignable with all of the N permanent magnets in the hybrid squirrel cage and permanent magnet outer rotor.

10. The motor of claim 1, wherein the combined permanent magnets and gaps at ends of the permanent magnets in the hybrid squirrel cage and permanent magnet outer rotor are angularly spaced apart by angular segments S, and the first bars in the hybrid squirrel cage and permanent magnet outer rotor reside uniformly angularly spaced apart in the angular segments S.

11. The motor of claim 10, wherein the first bars in the hybrid squirrel cage and permanent magnet outer rotor are at a common radius.

12. The motor of claim 1, wherein the squirrel cage inner rotor includes angularly spaced apart, axially running slots on a surface of the second rotor core facing the hybrid squirrel cage/permanent magnet outer rotor, the slots angularly spaced apart to align with the permanent magnets in the first rotor core.

13. The motor of claim 12, wherein the number of slots is equal to the number of permanent magnets in the hybrid squirrel cage and permanent magnet outer rotor.

14. A method for clutch-less hybrid squirrel cage and permanent magnet motor operation comprising:
providing an AC signal to a fixed stator;
creating a rotating stator magnetic field cooperating with outer and inner rotors comprising:
a hybrid squirrel cage and permanent magnet outer rotor residing coaxial with a motor shaft and having a first rotor core, angularly spaced apart permanent magnets embedded in the first rotor core, and first squirrel cage bars embedded in the first rotor core, the hybrid squirrel cage and permanent magnet outer rotor not rotationally mechanically coupled to the motor shaft at any time, other than mechanical rotational coupling through bearings coupling the hybrid squirrel cage and permanent magnet outer rotor to the motor shaft, and the hybrid squirrel cage and permanent magnet outer rotor capable of rotating independently of the motor shaft, and solely mechanically coupled to all other motor elements through the bearings; and
a squirrel cage inner rotor residing coaxial with the motor shaft and having a second rotor core, second bars embedded in the second rotor core, and the squirrel cage inner rotor rotationally fixed to the motor shaft;
at startup, the rotating stator magnetic field inductively cooperating with the first bars of the hybrid squirrel cage and permanent magnet outer rotor to create torque on the hybrid squirrel cage and permanent magnet outer rotor, and reducing magnetic cooperation of the rotating stator magnetic field with the permanent magnets of the hybrid squirrel cage and permanent magnet outer rotor, thereby reducing an effect of preventing acceleration of the hybrid squirrel cage and permanent magnet outer rotor due to the permanent magnets;
accelerating the hybrid squirrel cage and permanent magnet outer rotor towards synchronous engine speed;
the rotating permanent magnets of the hybrid squirrel cage and permanent magnet outer rotor creating a permanent magnet rotating permanent magnet field;
the rotating permanent magnet field inductively cooperating with the second bars of the squirrel cage inner rotor to create torque on the squirrel cage inner rotor;
as the hybrid squirrel cage and permanent magnet outer rotor and squirrel cage inner rotor approach the synchronous engine speed, magnetically coupling rotation of the squirrel cage inner rotor to the hybrid squirrel cage and permanent magnet outer rotor; and
the rotating stator magnetic field coupling with the permanent magnets, passing through the permanent magnets into the squirrel cage inner rotor, in synchronous operation with the permanent magnets.

15. The motor of claim 14, wherein, as both the hybrid squirrel cage and permanent magnet outer rotor and squirrel cage inner rotor approach the synchronous engine speed, slots on a circumferential surface of the squirrel cage inner rotor simultaneously cooperating with the N permanent magnets of the hybrid squirrel cage and permanent magnet outer rotor to create salient poles magnetically coupling rotation of the squirrel cage inner rotor to the hybrid squirrel cage and permanent magnet outer rotor.

16. The motor of claim 14, wherein:
the hybrid squirrel cage and permanent magnet outer rotor includes, axially running slots on a surface of the second rotor core facing the hybrid squirrel cage and permanent magnet outer rotor, the slots angularly spaced to be alignable with the N permanent magnets of the hybrid squirrel cage and permanent magnet outer rotor; and
further including, as the hybrid squirrel cage and permanent magnet outer rotor and squirrel cage inner rotor approach the synchronous engine speed, the slots on the surface of the squirrel cage rotor cooperating with the permanent magnets of the hybrid squirrel cage and permanent magnet rotor, to create salient poles magnetically coupling rotation of the squirrel cage inner rotor to the hybrid squirrel cage and permanent magnet outer rotor.

17. The motor of claim 14, wherein slots on the surface of the squirrel cage rotor cooperate with the permanent magnet of the hybrid squirrel cage and permanent magnet rotor to create salient poles magnetically coupling rotation of the squirrel cage inner rotor to the hybrid squirrel cage and permanent magnet outer rotor at the synchronous speed, the slots angularly spaced apart to align with the magnets of the hybrid squirrel cage and permanent magnet rotor.

18. A clutch-less hybrid squirrel cage and permanent magnet motor comprising: a motor housing; a stator fixed to the motor housing and producing a rotating stator magnetic field rotating at a synchronous speed; a motor shaft rotatably connected to the motor housing and extending from at least one end of the motor housing for attachment to a load;
a hybrid squirrel cage and permanent magnet outer rotor residing coaxial with the motor shaft and not mechanically rotationally coupled to the motor shaft during any operation and capable of rotating independently of the motor shaft, and not mechanically rotationally coupled to any output or input shaft of the motor or to any rotational load, other than mechanical rotational coupling through bearings supporting the hybrid squirrel cage and permanent magnet outer rotor, the hybrid squirrel cage and permanent magnet outer rotor comprising: first rotor core; spaced apart permanent magnets embedded in the first rotor core; first squirrel cage bars embedded in the first rotor core; and
a squirrel cage inner rotor residing coaxial with and rotationally fixed to the motor shaft, the squirrel cage inner rotor comprising: a second rotor core; second squirrel cage bars embedded in the second rotor core; and having no permanent magnets;
wherein the hybrid squirrel cage and permanent outer rotor resides between the squirrel cage inner rotor and the stator, and the hybrid squirrel cage and permanent magnet outer rotor is magnetically rotationally coupled to the squirrel cage inner rotor at the synchronous speed.

19. The motor of claim 18, wherein:

the hybrid squirrel cage and permanent magnet outer rotor includes non-ferrous gaps in the rotor core present at ends of each permanent magnet; and the squirrel cage inner rotor includes angularly spaced apart, axially running slots on a surface of the second rotor core facing the hybrid squirrel cage and permanent magnet outer rotor, the slots angularly spaced apart to correspond to the angular spacing of the N permanent magnets of the hybrid squirrel cage and permanent magnet outer rotor.

\* \* \* \* \*